United States Patent
Gilbride et al.

(10) Patent No.: US 9,278,839 B2
(45) Date of Patent: Mar. 8, 2016

(54) MAST AND INTEGRAL DISPLAY MOUNT FOR A MATERIAL HANDLING VEHICLE

(75) Inventors: Matthew I. Gilbride, Frederick, MD (US); Gregory W. Smiley, Greene, NY (US)

(73) Assignee: The Raymond Corporation, Greene, NY (US)

(*) Notice: Subject to any disclaimer, the term of this patent is extended or adjusted under 35 U.S.C. 154(b) by 932 days.

(21) Appl. No.: 13/422,455

(22) Filed: Mar. 16, 2012

(65) Prior Publication Data

US 2012/0235804 A1  Sep. 20, 2012

Related U.S. Application Data

(60) Provisional application No. 61/454,421, filed on Mar. 18, 2011.

(51) Int. Cl.
| | |
|---|---|
| *B60Q 1/00* | (2006.01) |
| *B66F 9/06* | (2006.01) |
| *B62B 5/00* | (2006.01) |
| *B62B 3/06* | (2006.01) |
| *B62B 3/10* | (2006.01) |
| *B66F 9/075* | (2006.01) |

(52) U.S. Cl.
CPC .............. *B66F 9/063* (2013.01); *B62B 3/0612* (2013.01); *B62B 3/10* (2013.01); *B62B 5/0069* (2013.01); *B62B 5/0076* (2013.01); *B66F 9/0759* (2013.01); *B62B 2202/00* (2013.01); *Y10T 74/20834* (2015.01)

(58) Field of Classification Search
CPC .................................. B60Q 1/00; B60K 35/00
USPC ........ 340/438, 436, 903, 932.2, 10.1; 701/50, 701/301, 472
See application file for complete search history.

(56) References Cited

U.S. PATENT DOCUMENTS

| | | | |
|---|---|---|---|
| 4,918,362 A | 4/1990 | Christensen et al. | |
| 5,068,791 A | 11/1991 | Klopfleisch et al. | |
| 6,767,175 B2* | 7/2004 | Fujita et al. | 414/631 |
| 2006/0231301 A1 | 10/2006 | Rose et al. | |
| 2007/0269299 A1 | 11/2007 | Ross et al. | |
| 2010/0176922 A1* | 7/2010 | Schwab et al. | 340/10.1 |
| 2013/0190963 A1* | 7/2013 | Kuss et al. | 701/23 |

FOREIGN PATENT DOCUMENTS

| | | |
|---|---|---|
| CN | 200967732 Y | 10/2007 |
| EP | 0340406 A1 | 11/1989 |
| WO | 8505474 A1 | 12/1985 |

OTHER PUBLICATIONS

Three color photographs of lift truck.

* cited by examiner

*Primary Examiner* — Tai T Nguyen
(74) *Attorney, Agent, or Firm* — Quarles & Brady LLP (57) ABSTRACT

A mast and integral display mount for a material handling vehicle are shown. The mast mounts a locating apparatus such that a locating axis of the locating apparatus is coaxial with a steering axis of the steerable drive wheel of the material handling vehicle. An integral display mount may include a display unit and display screen housed in a display housing that is integral with the steering handle of the vehicle. The integral nature of the display mount allows the display unit to move with the steering handle during steering of the vehicle.

12 Claims, 7 Drawing Sheets

MAST AND INTEGRAL DISPLAY MOUNT FOR A MATERIAL HANDLING VEHICLE

CROSS REFERENCE TO RELATED APPLICATIONS

This application claims the benefit of U.S. Provisional Application No. 61/454,421, filed Mar. 18, 2011, the disclosure of which is hereby incorporated by reference for all purposes.

STATEMENT OF FEDERALLY SPONSORED RESEARCH OR DEVELOPMENT

Not applicable.

FIELD OF THE INVENTION

The present invention relates to industrial material handling vehicles. More particularly, the invention relates to a mast and an integral display mount for a material handling vehicle.

BACKGROUND

Industrial material handling vehicles are commonly found in warehouses, factories, shipping yards, and, generally, wherever pallets, large packages, or loads of goods are required to be transported from place to place. Material handling vehicles, commonly referred to as pallet trucks, typically include load bearing forks for lifting packages or pallets for transporting, an electric drive motor for propelling the truck, a steering control mechanism, and a brake.

Operators of industrial material handling vehicles have compiled and noted different information while completing tasks with the vehicles in a variety of ways. For example, in their simplest form, operators may have handwritten notes that include information such as completed orders or inventory of specific materials in the facility. More recently, industrial material handling vehicles have been equipped with scanners and display screens to provide information regarding tasks or materials to aid the operator. Depending on their placement, the display screens may be difficult for the operator to view or, in the circumstance where the display screen is a touch screen, the placement may hinder operation of the touch screen.

Additionally, to improve productivity and reduce certain costs, industrial material handling vehicles have been designed to include sensing features that allow them to be an automatic guided vehicle (AGV). An AGV may be programmed to store travel routes and include a control system which is integrated with the drive, steering, and braking systems for the vehicle. Among other reasons, sensing or locating features may be included in an AGV to detect the presence of an object to be lifted, as well as its position and orientation. This sensing or locating equipment, however, presents additional components (e.g. cameras, sensors, etc.) that must be installed on the vehicle. Mounting these additional components in a fashion that does not affect the performance of the AGV or hinder maintenance tasks thereon presents challenges. Furthermore, programming the sensing or locating features to coordinate with the drive system of the lift truck may be troublesome depending on where the sensing or locating equipment is installed.

Therefore, it is an object of the invention to provide an industrial material handling vehicle that overcomes these problems.

SUMMARY OF THE INVENTION

The present invention provides for an automatic guided material handling vehicle that includes a locating apparatus that is mounted to a mast in such a manner that the programming of the locating apparatus is simplified and the manner in which it is mounted does not hinder an operator's ability to provide maintenance on the vehicle or to manually operate the vehicle. The present invention also provides for a display screen that is integrated with the steering handle such that the display screen moves with the steering handle. This integrated design provides the operator with quick access to view and/or interact with the display screen.

In one form, the invention provides for a mast for a material handling vehicle. The material handling vehicle includes a body, a battery compartment, a locating apparatus, a steering mechanism with a steering handle, and a steerable drive wheel coupled to the body and controlled by the steering mechanism. The steerable drive wheel includes a steering axis. The mast includes a first support member for coupling to the body of the material handling vehicle. The first support member includes a portion that projects at an angle towards a front of the material handling vehicle. The portion of the first support member that projects at an angle towards a front of the material handling vehicle is configured such that a locating axis of the locating apparatus is coaxial with the steering axis and a mass of the locating apparatus is transferred to the material handling vehicle at a position behind the steering axis.

In another form, the invention provides for an automatic guided material handling vehicle that includes a body, a fork carriage with load bearing forks, a steering mechanism, a steerable drive wheel, a locating apparatus, and a mast. The steering mechanism includes a steering handle. The steerable drive wheel is coupled to the body and is controlled by the steering mechanism. The steerable drive wheel includes a steering axis. The locating apparatus provides sensing and navigation capabilities to automatically guide the automatic guided material handling vehicle and includes a locating axis. The mast mounts the locating apparatus above the body and includes a support member coupled to the automatic guided material handling vehicle. The locating apparatus is mounted to the mast such that the locating axis of the locating apparatus is coaxial with the steering axis.

In yet another form, the invention provides for an integrated display for a material handling vehicle that includes a steering mechanism with a steering handle. The integrated display includes a display unit that is in electrical communication with a source of electrical power. The display unit includes a display screen. The integrated display mount also includes a display housing that houses the display unit. The display housing is integrated with the steering handle of the material handling vehicle such that the display housing moves with the steering handle during steering operation of the material handling vehicle.

These and other features, aspects, and advantages of the present invention will become better understood upon consideration of the following detailed description, drawings and appended claims.

DETAILED DESCRIPTION OF THE PREFERRED EMBODIMENT

Figure 1:
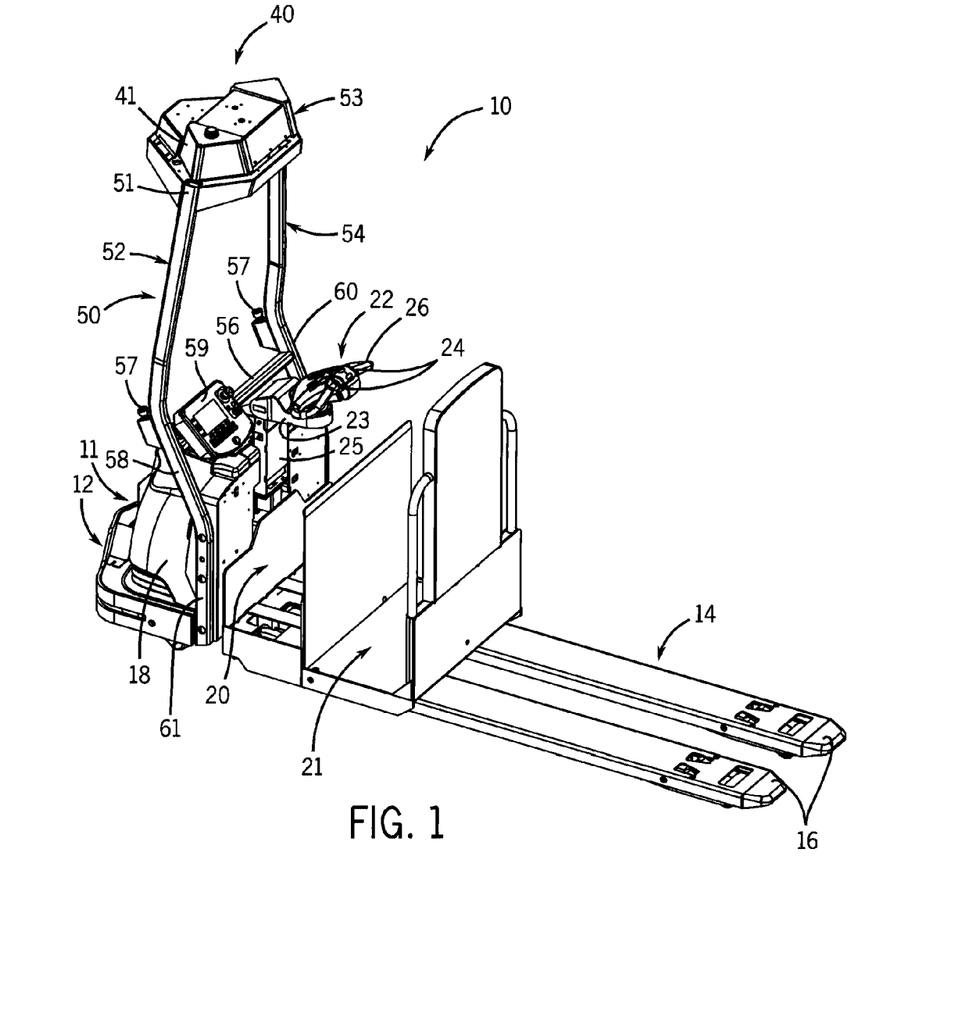
FIG. 1 is a perspective view of an automatic guided material handling vehicle embodying an aspect of the invention.
Figure 2:
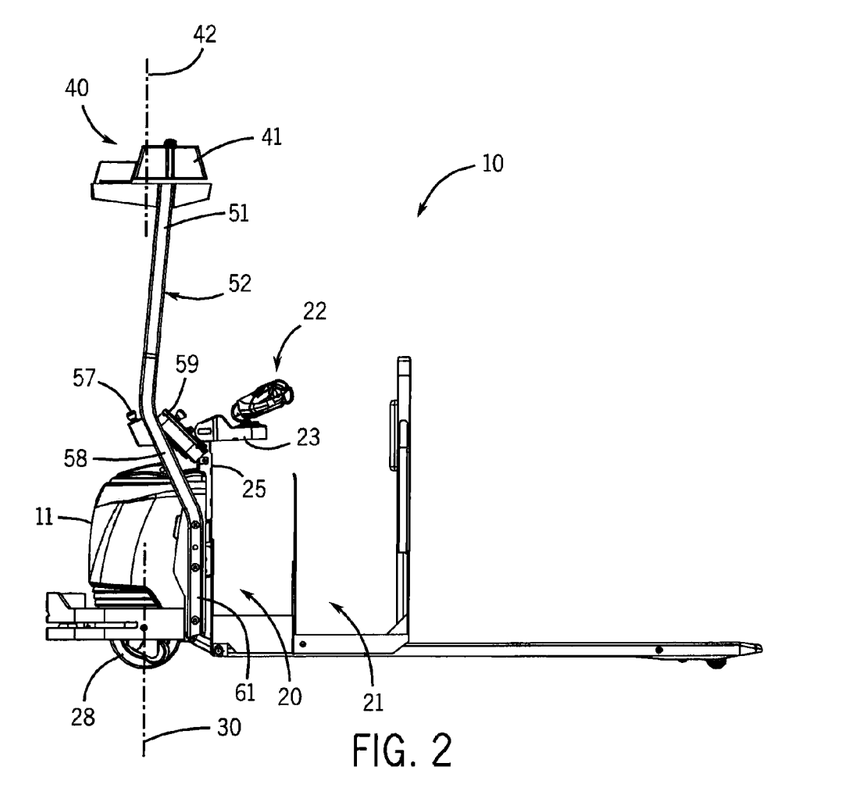
FIG. 2 is a side elevational view thereof.
Figure 3:
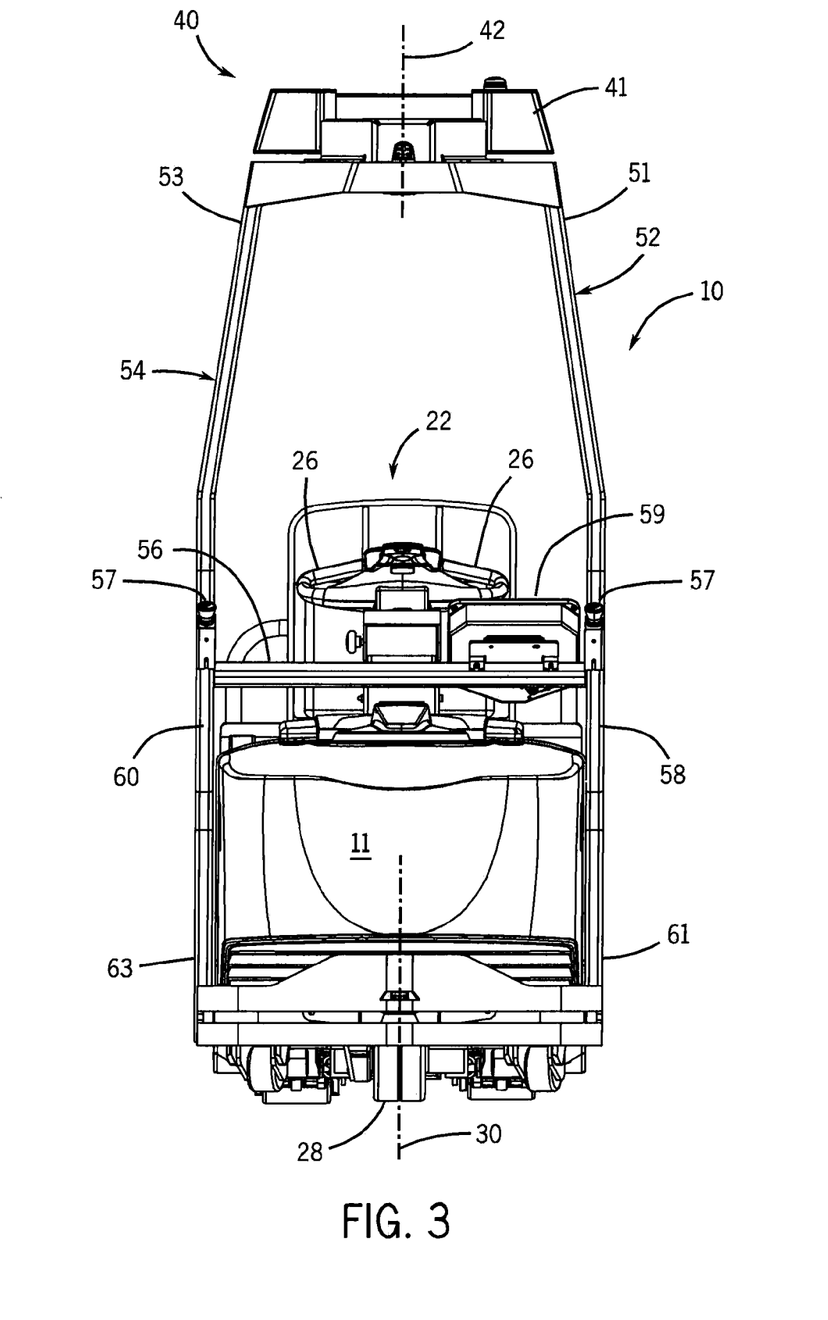
FIG. 3 is a front plan view thereof.
Figure 4:
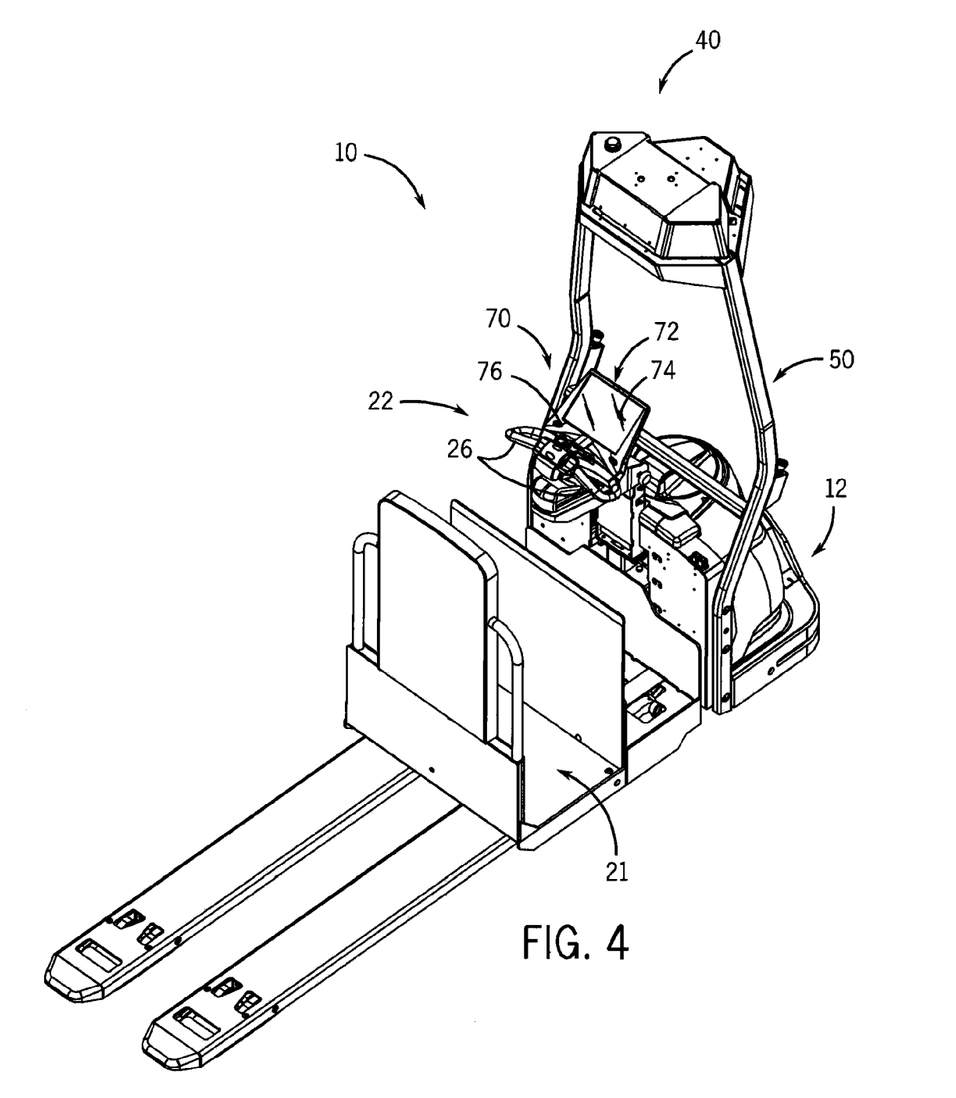
FIG. 4 is a perspective view of a material handling vehicle having an integral display mount embodying another aspect of the invention.

Referring to FIGS. 1-3, a material handling vehicle 10 embodying an aspect of the invention is shown. The material handling vehicle 10 includes a body 12, a fork carriage 14 with load bearing forks 16, a motor compartment 18 housing a motor (not shown), a battery compartment 20 for housing a battery (not shown), and an operator cabinet 21. The material handling vehicle 10 also includes a steering mechanism 22. The steering mechanism 22 is coupled to the body 12 of the vehicle through connection to a horizontal arm weldment 23 and a stalk 25. The steering mechanism 22 includes a steering handle 26 and a throttle control 24. Manipulation of the throttle control 24 sends a signal to control the throttle of the material handling vehicle 10. The steering mechanism 22 is coupled to a steerable drive wheel 28 that includes a steering axis 30.

The material handling vehicle 10 may also include one or more locating apparatuses 40 that allow the vehicle 10 to be an automatic guided vehicle (AGV). For example, specific types of locating apparatuses 40 include, but are not limited to, cameras, geographic positioning systems (GPS), and motion sensors. The locating apparatus 40 provides sensing and/or navigation capabilities to automatically guide the material handling vehicle 10, however, the fact that a material handling vehicle 10 has one or more such locating apparatuses 40 does not necessarily make the vehicle 10 an AGV. For example, a vehicle 10 may include a GPS such that the location of that vehicle 10 is known and recorded as part of a fleet management system. The locating apparatus 40 includes a locating axis 42 that may serve as a datum or reference for various calculations that may be necessary for computing the sensing features of the locating apparatus 40 and for carrying out corresponding actions of the material handling vehicle 10. As illustrated in FIG. 2, the locating axis 42 need not be centered with respect to the locating apparatus 40. The locating axis 42 can be aligned with and/or defined by a central axis of a piece of equipment of the locating apparatus 40, such as a camera.

The vehicle 10 includes a mast 50 that mounts the locating apparatus 40 above the body 12 of the material handling vehicle 10. The mast 50 may be mounted to the body 12 of the vehicle 10 by fastening ends 61, 63 of support members 52, 54 to the body 12 of the vehicle 10, or by other conventional methods of attachment. The locating apparatus 40 may include a structure 41 for mounting to the distal ends 51, 53 of the support members 52, 54, respectively, by fasteners or by other methods known by those skilled in the art. In the embodiment shown in FIGS. 1-3, the mast 50 includes two support members 52, 54 and a cross support 56. The first support member 52 is a mirror image of the second support member 54. The cross support 56 adds structural integrity to the mast 50 and engages the two support members 52, 54 at a height of the vehicle 10 that is below the steering handle 26. The cross support 56 is configured to provide an appropriate angle for mounting a display 59 and may also provide a convenient location for mounting accessories for the vehicle 10.

As best shown in FIGS. 2 and 3, the mast 50 mounts the locating apparatus 40 above the body 12 of the vehicle 10 such that the apparatus 40 will have an increased field of view. The mast 50 can also provide a convenient point of attachment for other accessories, including, but not limited to, stop buttons 57 for the vehicle 10. As shown in FIGS. 2 and 3, the mast 50 mounts the locating apparatus 40 such that the locating axis 42 of the locating apparatus 40 is coaxial with the steering axis 30 of the steerable drive wheel 28. By doing so, the programming of the locating apparatus 40 is simplified because the apparatus 40 does not need to be programmed to take into consideration any offset between the steering mechanism 22 and steering axis 30 with the locating axis 42 when calculating various parameters such as position and distance sensing, turning angles, braking distances, etc.

Each of the support members 52, 54 of the mast 50 include a portion 58, 60 that projects at an angle towards a front 11 of the vehicle 10. Not only do these angled portions 58, 60 assist with mounting the locating apparatus 40 in a manner where the locating axis 42 is coaxial with the steering axis 30, but the angled portions 58, 60 also provide additional benefits. The angled portions 58, 60 of the support members 52, 54 also direct the weight of the locating apparatus 40 transferred to the vehicle 10 closer to the center of mass of the material handling vehicle 10, providing improved balance and stability to the vehicle 10. This is accomplished by fastening the ends 61, 63 of the support members 52, 54 behind the steering axis 30, near the battery compartment 20 at a rear end of the body 12 of the vehicle 10. The angled portions 58, 60 also provide clearance to perform certain maintenance tasks on the vehicle 10. For example, replacing and/or installing a battery into the battery compartment 20 is simplified by having additional clearance between the support members 52, 54 and the compartment 20. Additionally, while the vehicle 10 may be provided with a locating apparatus 40 that allows it to perform as an AGV, there may be situations where an operator desires to manually operate the vehicle 10 from the operator cabinet 21. In those circumstances, the angled portions 58, 60 provide clearance for the steering handle 26 to move laterally during steering of the vehicle 10. The angled portions 58, 60 also improve the operator's field of view to the periphery of the vehicle 10.

Turning now to FIGS. 4-7, an integral display mount 70 that is integrated with the steering mechanism 22 is shown. The integral display mount 70 may be incorporated in a material handling vehicle 10, whether it be a material handling vehicle that is manually operated, or a material handling vehicle that is configured as an AGV similar to that as described above with respect to FIGS. 1-3.

The embodiment shown in FIGS. 4-7 illustrates that the integral display mount 70 is integrated with the steering mechanism 22 by being integrated with the steering handle 26 for the material handling vehicle 10. The display mount 70 includes a display unit 72 that has a display screen 74. The display unit 72 may receive power from the battery that is housed within the battery compartment 20 that provides power to the vehicle 10, or alternatively, the display unit 72 may receive power from a different source. The display unit 72 is housed within a display housing 76.

Figure 5:
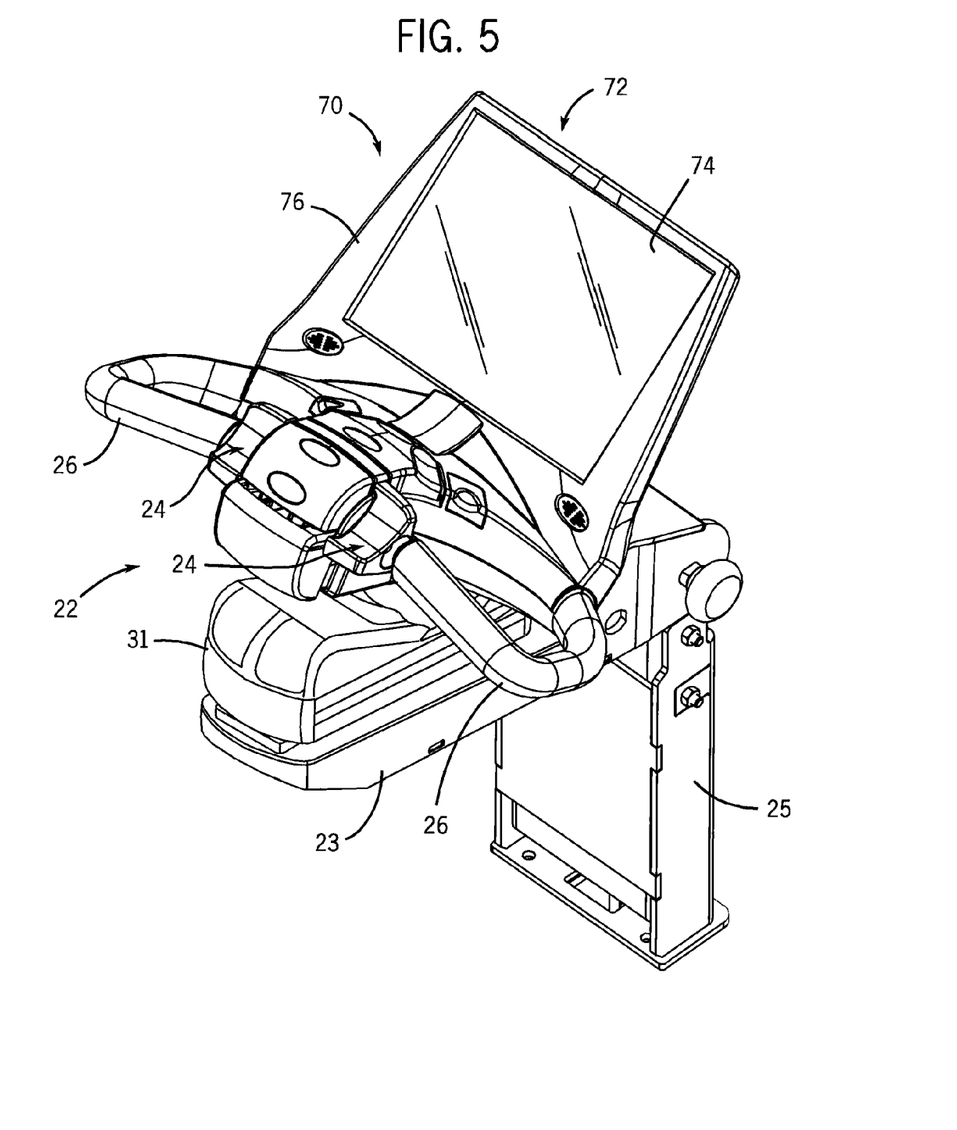
FIG. 5 is a perspective view showing the integral display mount of FIG. 4.

As best shown in FIG. 5, the display housing 76 is integrated with the steering handle 26. As a result, the display housing 76, along with the display unit 72 and display screen 74, synchronously moves with the steering handle 26 as the handle 26 moves during steering of the vehicle 10. As previously described, the steering handle 26 may incorporate the throttle control 24 for the vehicle.

The integral display mount 70 is coupled to the body 12 of the vehicle 10 through a control assembly 29 and a stalk 25. The stalk 25 allows for synchronous vertical adjustment of the steering handle 26 and the display housing 76. The vertical adjustment of the display housing 76 and steering handle 26 increases operator comfort and maneuverability during operation of the vehicle 10. In the embodiment shown in FIGS. 4-7, the control assembly 29 forms part of the steering mechanism 22 and includes a horizontal arm weldment 23 and a pivot arm 31. The control assembly 29 allows the operator to pivot the steering handle 26 and the display housing 76 with respect to the vehicle 10 in a horizontal plane about pivot point A located between the horizontal arm weldment 23 and the pivot arm 31 because the display housing 76 is coupled to the pivot arm 31. The display housing 76 and steering handle 26 can also pivot about a pivot point B between the integral display mount 70 and the pivot arm 31, such that the display screen 74 and steering handle 26 stay parallel to the operator and operator cabinet 21 to allow easier access to control features of the integral display mount 70 and/or steering handle 26 and throttle control 24. Such an articulation of the control assembly 29 of the steering mechanism 22 is shown in FIG. 7.

Of course, the steering mechanism 22 and the display housing 76 need not be configured to articulate as described above. For example, the steering handle 26 and the display housing 76 may rotate about a single pivot point and/or translate horizontally. In such a circumstance, the display housing 76 still moves with the steering handle 26 providing efficient viewing and operation of the display screen 74, as discussed further below. Additionally, it is contemplated that the integral display mount 70 can be integrated with the steering mechanism 22 by directly coupling to the pivot arm 31, rather than to the steering handle 26. In such a configuration, the integral display mount 70 moves with the steering mechanism 22 during steering operation of the vehicle 10. The integral display mount 70 could be rotatably coupled to the pivot arm 31 to allow for further manipulation of the display unit 72 based on the operator's preferences and positioning.

The integrated design of the display mount 70 reduces components near the front of the vehicle 10, and thus, provides a more streamlined design. The integral display mount 70 also provides a display unit 72 that may have controls that will be quick to adjust because the display unit 72 will be moving with the operator during steering of the vehicle 10, and therefore, the controls will be near the operator's hands. Similarly, if the display screen 74 is a touch screen, the operator will also have quick and efficient operation of the touch screen due to the fact that the display screen 74 is integrated with the steering handle 26. As shown in FIG. 7, if the integrated display mount 70 has been articulated or pivoted to one side of the lift truck 10, an operator can view and control features on the display screen 74, as well as manipulate the vehicle 10 via the use of the steering handle 26 and throttle control 24. Because the integral display mount 70 is integrated to the steering mechanism 22, access to the display unit 72 and display screen 74 is not compromised during horizontal articulation of the control assembly 29 as can be the case in situations where the display unit and screen are mounted on other components of the vehicle 10.

Figure 6:
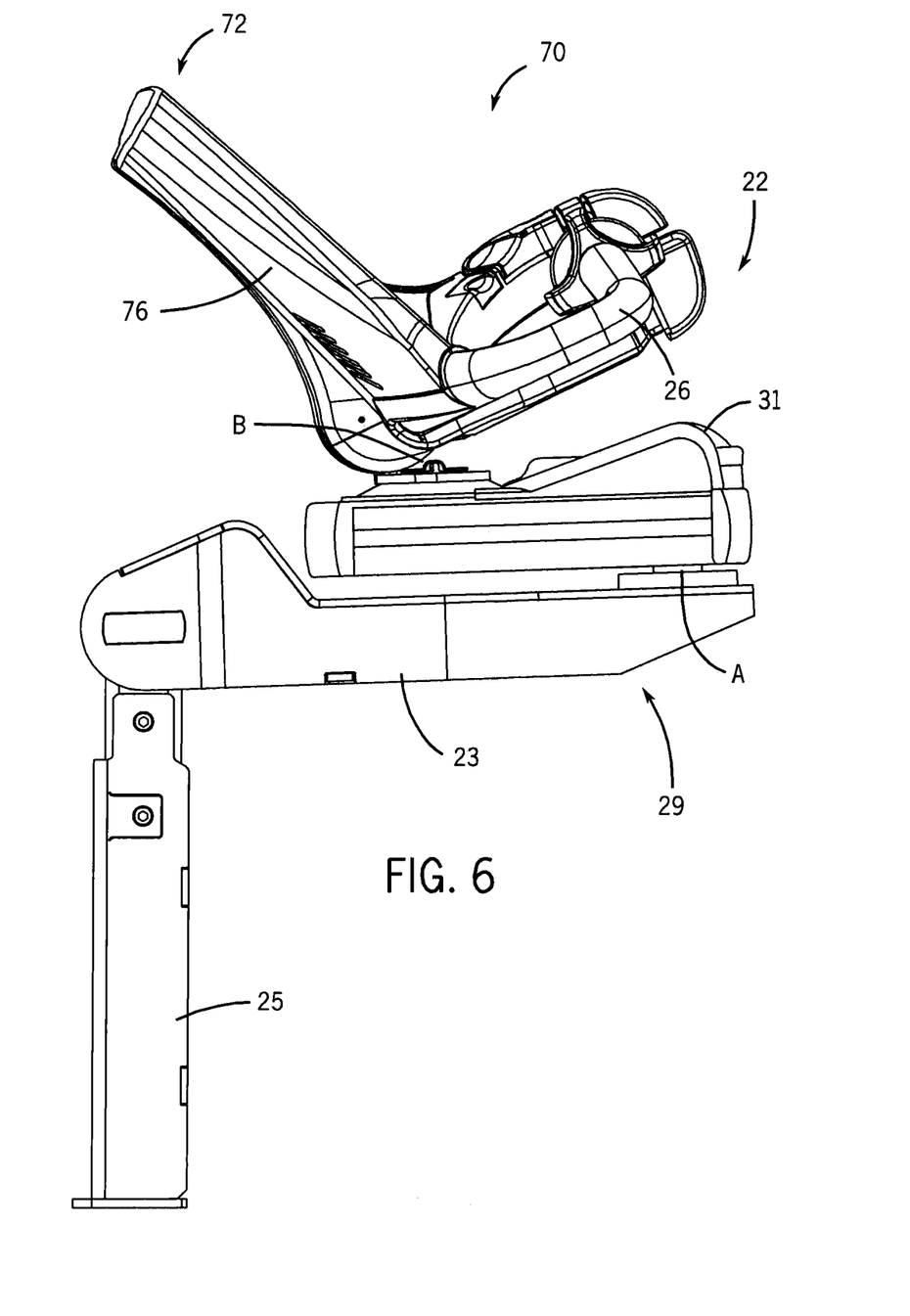
FIG. 6 is a side elevational view showing the integral display mount of FIG. 4.
Figure 7:
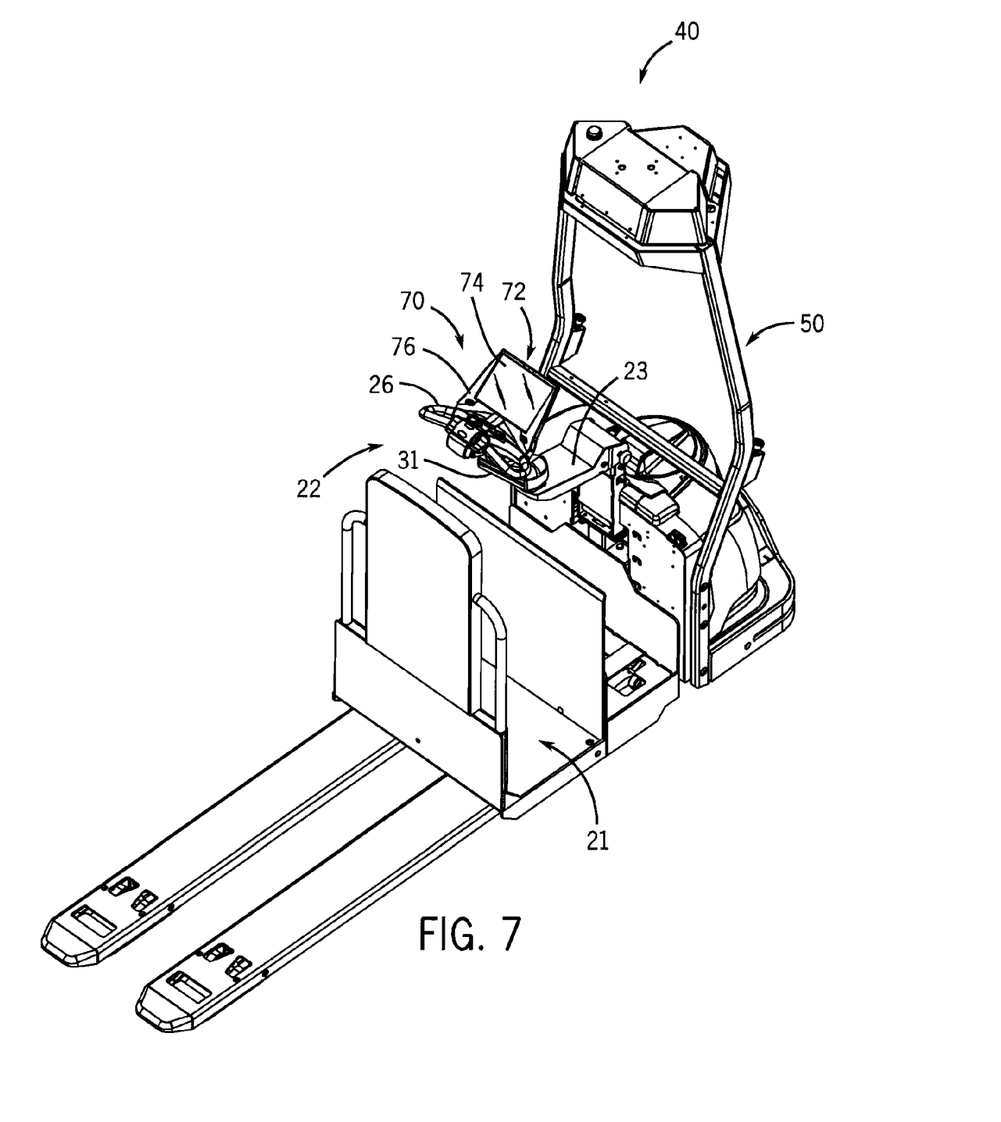
FIG. 7 is a perspective view of the material handling vehicle of FIG. 4, where the steering mechanism is in an articulated position.

As best shown in FIGS. 5 and 6, the display housing 76 is angled with respect to the steering handle 26. The angled nature of the housing 76 provides the operator with an improved viewing angle of the screen 74 and may reduce glare on the display screen 74. The angled nature of the display housing 76 also facilitates the operation of the display unit 72 if a touch screen is used as the display screen 74.

The display unit 72 may be configured to display a variety information, including, but not limited to, information regarding the functionality of the vehicle 10, warehouse management system applications, and fleet management information. As a few examples, information related to the functionality of the vehicle 10 can include speed of the vehicle, battery power, amount of time to maintenance, etc. Warehouse management system applications can include applications relating to displaying certain items of an order and the locations of those items. Fleet management information can include statistics on all vehicles 10 that form part of a fleet, such as the number and locations of all vehicles, the number of vehicles currently being used, number of hours each vehicle has been used in a specified time period, etc. Because the integrated display mount 70 can display information relating to the functionality of the vehicle 10, warehouse management system applications, and fleet management information all in one display unit 72, this information may be accessed efficiently and more quickly than if such information was on multiple display units in various positions on the vehicle 10.

Additionally, the display unit 72 may provide a navigation module interface in which sensory and situational awareness inputs, in addition to control inputs (e.g. throttle, braking, and turning), all pass through a common interface. The sensory and situational awareness inputs can include information obtained from equipment such as the location apparatus 40 described above that allow the vehicle 10 to function as an AGV, or from other equipment configured on the vehicle 10 that provide feedback on a certain aspect of the vehicle or its environment. In some circumstances, the display unit 72 can be programmed to display certain outputs or messages that are based on the inputs received. Because the display unit 72 provides a common interface for sensory and situational awareness inputs as well as control inputs, the display unit 72 can also be programmed to prioritize which, if any, outputs or messages are displayed on the display unit 72.

The foregoing description was primarily directed to preferred embodiments of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not be limited by the above disclosure.

The invention claimed is:

1. A mast for a material handling vehicle that includes a body, a battery compartment, a locating apparatus, a steering mechanism with a steering handle, and a steerable drive wheel coupled to the body and controlled by the steering mechanism, the steerable drive wheel including a steering axis, the mast comprising:
   a first support member coupling to the body of the material handling vehicle and mounting the locating apparatus above the body of the material handling vehicle, the first support member including a portion of the first support member that projects at an angle towards a front of the material handling vehicle, the portion of the first support member that projects at an angle towards a front of the material handling vehicle configured such that a locating axis of the locating apparatus is coaxial with the steering axis and a mass of the locating apparatus is transferred to the material handling vehicle at a position behind the steering axis.

2. The mast of claim 1, wherein the portion of the first support member that projects at an angle towards a front of the material handling vehicle provides clearance near the battery compartment of the material handling vehicle.

3. The mast of claim 1, wherein the mast further includes a second support member, the second support member including a second angled portion that projects at an angle towards the front of the material handling vehicle.

4. The mast of claim 1, wherein the locating apparatus provides sensing and navigation capabilities to automatically guide the material handling vehicle.

5. An automatic guided material handling vehicle comprising:
- a body;
- a fork carriage with load bearing forks;
- a steering mechanism including a steering handle;
- a steerable drive wheel coupled to the body and controlled by the steering mechanism, the steerable drive wheel including a steering axis;
- a locating apparatus for providing sensing and navigation capabilities to automatically guide the automatic guided material handling vehicle, the locating apparatus including a locating axis; and
- a mast for mounting the locating apparatus above the body, the mast including a support member coupled to the automatic guided material handling vehicle, the locating apparatus being mounted to the mast such that the locating axis is coaxial with the steering axis.

6. The automatic guided material handling vehicle of claim 5, wherein at least a portion of the support member projects at an angle towards a front of the automatic guided material handling vehicle.

7. The automatic guided material handling vehicle of claim 6, further including a battery compartment for housing a battery, wherein the portion of the support member projecting at an angle towards the front of the automatic guided material handling vehicle provides clearance near the battery compartment.

8. The automatic guided material handling vehicle of claim 6, wherein the portion of the support member projecting at an angle towards the front of the automatic guided material handling vehicle provides clearance for manual operation of the steering handle.

9. The automatic guided material handling vehicle of claim 8, the mast further including an additional support member and a cross support that engages the support member and the additional support member.

10. The automatic guided material handling vehicle of claim 9, wherein the additional support member is a mirror image of the support member.

11. The automatic guided material handling vehicle of claim 9, wherein the cross support is configured to engage the support member and the additional support member at a height of the automatic guided material handling vehicle below the steering handle.

12. The automatic guided material handling vehicle of claim 5, wherein the locating apparatus includes at least one of a camera and a motion sensor.

* * * * *